US008556171B2

(12) United States Patent
Naccache

(10) Patent No.: US 8,556,171 B2
(45) Date of Patent: Oct. 15, 2013

(54) METHOD OF PRINTING RECEIPTS

(75) Inventor: David Naccache, Paris (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 441 days.

(21) Appl. No.: 12/446,422

(22) PCT Filed: Oct. 17, 2007

(86) PCT No.: PCT/FR2007/001709
§ 371 (c)(1),
(2), (4) Date: Jun. 22, 2009

(87) PCT Pub. No.: WO2008/049998
PCT Pub. Date: May 2, 2008

(65) Prior Publication Data

US 2010/0044425 A1 Feb. 25, 2010

(30) Foreign Application Priority Data

Oct. 20, 2006 (FR) ...................................... 06 09216

(51) Int. Cl.
*G06K 15/00* (2006.01)

(52) U.S. Cl.
USPC ........................................... 235/383; 235/7 R

(58) Field of Classification Search
USPC ...................................... 235/2, 7 R, 375, 383
See application file for complete search history.

(56) References Cited

U.S. PATENT DOCUMENTS

| | | | | |
|---|---|---|---|---|
| 3,042,919 | A * | 7/1962 | Simjian | 346/22 |
| 3,186,636 | A * | 6/1965 | Hoffman et al. | 235/3 |
| 4,173,420 | A * | 11/1979 | Okabe | 400/618 |
| 4,188,138 | A * | 2/1980 | Yamazaki | 400/586 |
| 4,293,236 | A * | 10/1981 | Shimizu | 400/593 |
| 4,312,037 | A * | 1/1982 | Yamakita | 705/24 |
| 5,139,353 | A * | 8/1992 | Ota | 400/584 |
| 5,354,134 | A * | 10/1994 | Patry | 400/73 |
| 6,030,133 | A * | 2/2000 | Endo | 400/82 |
| 6,095,414 | A * | 8/2000 | Long et al. | 235/385 |
| 6,408,279 | B1 * | 6/2002 | Mason | 705/16 |
| 6,623,100 | B1 * | 9/2003 | Baitz et al. | 347/37 |
| 6,663,304 | B2 * | 12/2003 | Vives et al. | 400/82 |

(Continued)

FOREIGN PATENT DOCUMENTS

| | | |
|---|---|---|
| EP | 0 905 661 | 3/1999 |
| EP | 0905661 A1 | 3/1999 |

(Continued)

OTHER PUBLICATIONS

International Search Report from counterpart foreign Application No. PCT/FR2007/001709 filed on Oct. 17, 2007.

(Continued)

*Primary Examiner* — Daniel Hess
*Assistant Examiner* — Paultep Savusdiphol
(74) *Attorney, Agent, or Firm* — David D. Brush; Westman, Champlin & Koehler, P.A.

(57) ABSTRACT

An electronic payment terminal and method are provided for printing tickets. The method includes: carrying out payment transactions with the terminal; after each transaction, simultaneously printing several tickets concerning the transaction made. Accordingly, when several transactions are carried out successively, the time required for printing the tickets is shortened since the tickets are printed at the same time.

18 Claims, 1 Drawing Sheet

(56) References Cited

U.S. PATENT DOCUMENTS

| | | | | |
|---|---|---|---|---|
| 6,769,606 | B1 * | 8/2004 | Blosser et al. | 235/379 |
| 6,824,322 | B2 * | 11/2004 | Miyajima | 400/621 |
| 6,876,978 | B1 * | 4/2005 | Walker et al. | 705/14.1 |
| 7,344,070 | B2 * | 3/2008 | Nobutani | 235/383 |
| 7,480,625 | B2 * | 1/2009 | Yajima | 705/16 |
| 8,114,812 | B2 * | 2/2012 | Vandemark et al. | 503/226 |
| 2003/0086740 | A1 * | 5/2003 | Miyajima | 400/621 |
| 2003/0143007 | A1 * | 7/2003 | Vives et al. | 400/82 |
| 2004/0054583 | A1 * | 3/2004 | Nye et al. | 705/14 |
| 2004/0085579 | A1 * | 5/2004 | Campbell et al. | 358/1.18 |
| 2004/0156664 | A1 * | 8/2004 | Vives et al. | 400/82 |
| 2005/0073710 | A1 * | 4/2005 | Campbell et al. | 358/1.14 |
| 2005/0211773 | A1 * | 9/2005 | Nobutani | 235/383 |
| 2005/0286088 | A1 * | 12/2005 | Takagi | 358/3.28 |
| 2005/0289077 | A1 * | 12/2005 | Yajima | 705/62 |
| 2007/0207926 | A1 * | 9/2007 | Van Demark et al. | 503/226 |

FOREIGN PATENT DOCUMENTS

| | | | |
|---|---|---|---|
| FR | 2781103 | A1 | 1/2000 |
| FR | 2 781 103 | | 2/2002 |
| FR | 2 812 745 | | 2/2002 |
| FR | 2 813 038 | | 2/2002 |
| FR | 2812745 | A1 | 2/2002 |
| FR | 2813038 | A1 | 2/2002 |
| FR | 2 820 855 | | 8/2002 |
| FR | 2820855 | A1 | 8/2002 |

OTHER PUBLICATIONS

English Translation of the International Preliminary Report on Patentability of Counterpart Application No. PCT/FR2007/001709, filed on Oct. 17, 2007.

* cited by examiner

METHOD OF PRINTING RECEIPTS

CROSS-REFERENCE TO RELATED APPLICATIONS

This Application is a Section 371 National Stage Application of International Application No. PCT/FR2007/001709, filed Oct. 17, 2007 and published as WO 2008/049998 on May 2, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

This disclosure relates to a method of printing receipts, in particular for electronic payment terminals.

BACKGROUND OF THE DISCLOSURE

Electronic payment terminals are used to record and carry out a secure payment transaction. One or more receipts can be printed in order to account for the transaction.

The problem is that the time required for printing this or these receipts is generally long.

SUMMARY

An aspect of the disclosure relates to a method of printing receipts for an electronic payment terminal, the method comprising carrying out payment transactions with the terminal, and, after each transaction, simultaneously printing several receipts concerning the transaction made.

According to one alternative, the terminal includes a plurality of printing heads, the receipts each being printed on one printing head.

According to one alternative, at least one receipt is printed by the terminal and at least one receipt is printed remotely.

According to one alternative, the receipts have already been at least partially printed at the time of the printing step.

According to one alternative, the partially printed receipt contains information which is invariable from one transaction to another.

According to one alternative, after the step of printing receipts concerning the transaction made, the method further comprises a step of partially pre-printing at least one receipt.

According to one alternative, the partial printing step comprises printing the current date.

According to one alternative, the current date is no longer printed starting from a predetermined hour.

According to one alternative, after the partial printing step, the method further comprises a step of crossing out a partially printed receipt.

According to one alternative, the method further includes counting the already partially pre-printed receipts, counting the transactions carried out, comparing the number of partially pre-printed receipts, and determining the remaining number of partially pre-printed receipts.

According to one alternative, the method further includes a step of supplying the receipts, all of the receipts having been partially pre-printed.

An embodiment of the invention also relates to a payment terminal comprising at least one receipt printing head, the terminal being capable of carrying out payment transactions and of simultaneously printing several receipts concerning each transaction.

According to one alternative, the terminal further includes a plurality of printing heads.

According to one alternative, the terminal is further capable of remotely printing a receipt.

According to one alternative, the terminal is capable of printing a partially pre-printed receipt.

According to one alternative, the terminal further includes receipts all of which have been partially pre-printed.

According to one alternative, the terminal includes a bi-directional motor for moving the receipt.

The terminal is designed to implement the method as previously described.

BRIEF DESCRIPTION OF THE DRAWINGS

Other characteristics and advantages will become apparent upon reading the following detailed description of embodiments of the invention, given for illustrative purposes only and with reference to the appended drawings, which show.

DETAILED DESCRIPTION OF ILLUSTRATIVE EMBODIMENTS

An embodiment of the invention relates to a method of printing receipts for an electronic payment terminal. The method includes carrying out successive payment transactions with the terminal, and, after each transaction, printing a receipt concerning the transaction made, the receipt having been previously and partially printed at the time of the printing step. In this way, while several transactions are carried out successively, the printing time for the receipts is shorter because the receipts already contain printed information. As a matter of fact, once the transaction has been carried out, nothing more remains but to print certain additional information in addition to that already printed.

Figure 1:
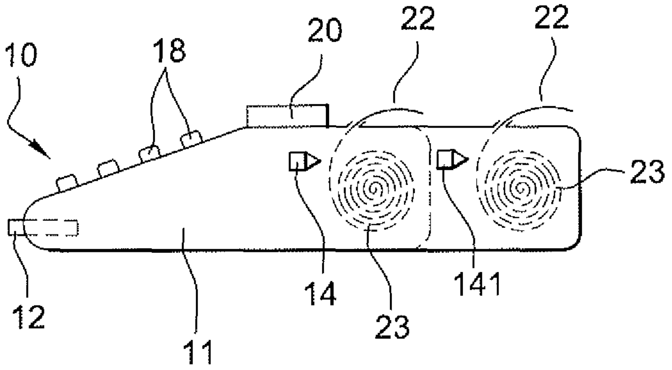
FIG. 1, a payment terminal.

FIG. 1 shows an electronic payment terminal 10. A terminal such as this is typically a computer placed in a merchant's establishment, which enables bank card payments to be made (such as smart cards or magnetic strip cards). The merchant inserts the customer's card into the terminal reader and enters the amount of the transaction. The customer validates their purchase, e.g., by entering their personal identification number on the keypad of the device, and receives a receipt confirming the transaction. Once the transaction has been carried out, a receipt is printed in order to account for the transaction. It may be that this receipt will be left with the customer and that a second receipt will be printed and left with the merchant. Provisions may optionally be provided for the terminal to be connected to management means (e.g., a cash register), which enables point-of-sale management to be ensured. The terminal/means of management system then comprises a point-of-sale terminal.

The terminal 10 is capable of carrying out several successive transactions. In other words, the terminal is capable of carrying out several payment operations which are spaced apart or close together in time. To illustrate, customers at the same restaurant table can in turn each pay their share using the terminal. At least one receipt is printed by the terminal for each of these payment transactions.

The terminal can, for example, comprise a portable housing 11; the housing 11 is hand-held and can be transported without difficulty. This housing can rest on a base when not in use, and, when in use, communicates with this base via a wireless connection, e.g., radio. The base can be connected to the management means; it typically includes a modem making it possible to obtain debit authorizations from authorized institutions.

The terminal 10 can comprise a receipt 22 printing head 14. In other words, the terminal can comprise a printer built into the terminal 10; the printing head is built into the housing 11. The printing head thus makes it possible to print the receipts without having to return to the base; the receipts can be printed on-site. In one embodiment, the terminal can comprise a plurality of printing heads 14. FIG. 1 shows two printing heads 14, 141. The plurality of printing heads 14, 141 enable several receipts to be printed simultaneously, as will be explained more fully hereinbelow. The second head 141 forms part of a printing module which can be connected to the housing 11. The user has the choice of connecting additional printing modules; the modules can be added to the housing so as to render the assembly integral. When additional heads are used, the output signals to the printing head 14 are advantageously diverted to the other printing heads so as to control a plurality of printing heads.

The terminal can comprise a receipt-driving motor, whereby the receipts are unwound opposite the head 14 in order to carrying out printing. The terminal can comprise as many motors as there are heads. Furthermore, the motor or motors can be bi-directional, in the sense that the motors can drive the receipts in one direction or the other.

The terminal can include a smart card reader 12, a modem, and a GSM card. The terminal is preferably compatible with the GPRS standard, so as to take advantage of a better bandwidth. For example, the EPT can be equipped with a GSM/GPRS communication module (900/1800 or 900/1900 MHz dual-band). In the same way, further provisions can be made for the terminal to be compatible with a third-generation mobile telephone network. The terminal can also include a keypad 18 for inputting information of the transaction amount and smart card personal identification number type. The keypad 18, for example, can comprise "Validation," "Correction," "Cancellation," "O," "1," "2," "3," . . . "9," etc. keys. A screen 20 can display the information as it is being input.

The terminal 10 is equipped, for example, with a 32-bit processor supporting common cryptographic methods (RSA, DES, triple-DES . . . ). The architecture of the processor is preferably chosen so as to enable several applications to run independently of one another (multi-application and multi-tasking) within the terminal 10. In this regard, one of these applications can be dedicated to managing printing tasks, as described hereinbelow. An application such as this can also be optionally loaded independently of the other applications provided in the EPT, so as to ensure software security (or software tightness).

The receipts 22 can be printed by the printing head 14 situated inside the housing 11 of the terminal. The presence of the printing head 14 inside the housing 11 makes it possible to print the receipt 22 and for the receipt to be handed over to the customer immediately; this makes it possible to avoid going back and forth to the base, in particular in a restaurant where customers do not necessarily pay at the register. The printing head 14 can also be located on the base, which makes it possible to reduce the size of the housing.

Figure 2:
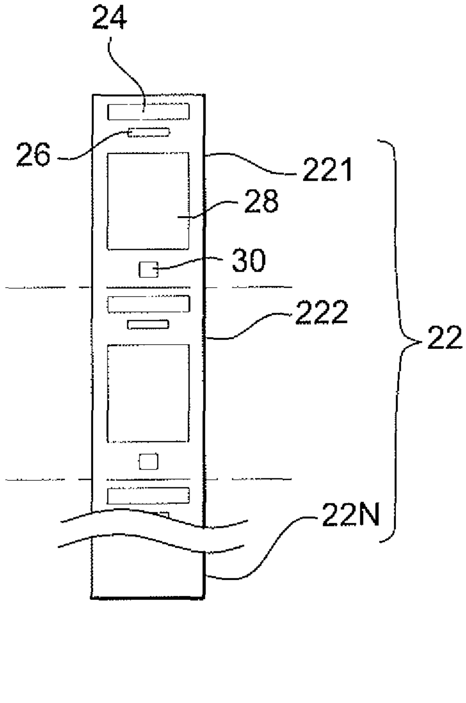
FIG. 2, receipts printed by the payment terminal of FIG. 1.

The receipts are preferably supplied in the form of a roll 23, as shown in FIG. 1. The roll 23 can be mounted inside the housing 10 and unroll as the receipts are printed. The user cuts off the receipt on their own once all of the information has been printed; the receipts do not have a predetermined length but a length determined by the information being printed. FIG. 2 shows the receipts in the form of a strip. Several receipts 221, 222, etc. 22N are shown as uncut, with dotted lines showing an imaginary demarcation between the receipts.

After each transaction, a receipt relating to each of the transactions is printed; the receipt can be handed over to the customer so that they have a trace of their payment. It can also be envisaged that two tickets relating to the same transaction can be printed, one of the tickets being given to the client, the other being given to the seller. Regardless of the number of receipts printed for each transaction, the receipt is partially pre-printed when it undergoes the printing relating to the transaction carried out. The receipt already contains information that no longer needs to be re-printed, which makes it possible to save time printing the receipt after the transaction has been carried out.

FIG. 2 shows the receipt 221 after the printing operation which followed completion of the transaction. The receipt 221 contains information which can be printed ahead of time or pre-printed. The receipt is partially printed in the sense that information relating to the future transaction is already printed. The information relating to the transaction is already printed when a new transaction begins, or even when the printing relating to the completed transaction begins. In this latter case, it can be anticipated for the preliminary and partial printing step to take place while the transaction is being carried out. This pre-printed information 24, 26, for example, relates to the contact information for the merchant at whose establishment the payment transaction was carried out; this may consist of the merchant's name and address. Since this information is invariable from one transaction to another, this information can already appear on the receipt to be printed when a printing operation relating to a completed transaction is initiated. The receipt 22 next contains information 28 which is printed once the transaction has been carried out. This information 28 corresponds, for example, to the amount of the transaction carried out. Since this information 28 is specific to the transaction carried out, this information 28 is then only printed once the transaction has been carried out. It is also possible to anticipate for information 30 located below information 28 to likewise be information which is invariable from one transaction to another; this information can then be pre-printed on the receipt being printed when a printing operation relating to a completed transaction is initiated. This type of information, for example, is of the "thank you" or "receipt to be retained by the customer" type. Thus, the receipt can include pre-printed information above and below the information 28 which is specific to the transaction and which is printed once the transaction has been carried out. Owing to the bi-directional motor, information above and below can be printed, and the receipt then put back into printing position. The fact of having nothing more to do but print the information determined by the transaction makes it possible to save time during printing of the receipts. This is particularly advantageous in the case of transactions which follow one upon the other, e.g., when customers at the same restaurant table pay separately.

The receipt 22 can be partially pre-printed according to several embodiments.

According to a first embodiment, after the step of printing a receipt relating to the transaction carried out, the method can include a partial printing step for at least one receipt relating to as many transactions as follow. In other words, once the transaction N has been completed and the corresponding receipt 22N has been printed, the method can include a step of partially printing the receipt 22N+1 relating to the future transaction N+1. Thus, when transaction N+1 is carried out, the receipt 22N+1 relating to this transaction N+1 is already partially printed, e.g., with the aforementioned information 24, 26, 30.

According to this embodiment, it is also possible to anticipate that, once transaction N has been completed and the corresponding receipt 22N has been printed, the method can include a step of partially printing several receipts 22(N+1) to 22(N+X) relating to X future transactions. Thus, when transaction N+1 is carried out, a certain number of receipts 22 relating to an equivalent number of transactions have already been printed, e.g., with the aforementioned information 24, 26, 30. During an off-peak time in the merchant's activity, this enables a certain number of receipts to be partially preprinted. Owing to the bi-directional motor(s), a certain number of receipts are printed by unwinding the roll via rotation of the motor in one direction, and then the pre-printed receipts are wound up in the other direction so that the terminal is ready for use.

It is then possible to anticipate counting the partially preprinted receipts. The method then likewise includes counting the transactions carried out; at each of these transactions, a partially pre-printed receipt is used. The method next includes comparing the number of partially pre-printed receipts with the number of transactions carried out. The method then determines the remaining number of partially pre-printed receipts. As a result, a decision can be taken to partially pre-print other receipts for future transactions.

If need be, for the first receipt of the roll, once the roll has been installed, the first receipt is immediately partially printed; thus, at the first transaction, the receipt being printed is already partially printed.

It is possible to anticipate for the method to comprise a step of crossing out a partially printed receipt. Thus, if a piece of information has been pre-printed, and if this information is incorrect, the method enables this information to be crossed out. This makes it possible to modify a receipt even though it has been partially pre-printed; thus, the pre-printed information is not definitive. In order to cross out a piece of information, it can be anticipated for a series of "x's" to be written over the information being crossed out.

During the partial printing step, it is foreseeable for the current date to be pre-printed. Since, throughout the entire day, this date remains invariable from one transaction to another, it is possible to write it on the receipts ahead of time. It is foreseeable for the date to no longer be pre-printed on the receipt starting from a pre-determined hour. This makes it possible to prevent the previous day's date from possibly appearing on a receipt—even though it is always possible to cross out false information, as indicated previously. For example, starting from 23:30 hours, the date is no longer a pre-printed piece of information; the date is only printed along with the information relating to the transaction which was carried out, such as the amount of the transaction. The hour as of which the date is no longer pre-printed can be modified; this makes it possible to adapt to the merchant's activity, a restaurant owner open late in the evening being capable of pushing back the time/hour starting with which the date is no longer pre-printed. Alternatively, after midnight, the last receipt(s) pre-printed with the previous day's date can be crossed out with an "x" so as to invalidate it (them). As described previously, the method makes it possible to count the pre-printed receipts and to determine the number of available receipts; thus, after midnight, the method makes it possible to recall all of the not yet used receipts which contain the previous day's date, so as to invalidate them.

According to a second embodiment for the partial preprinting of the receipts, it is foreseeable for the method to include a step of supplying receipts which are already partially pre-printed. The advantage is that it is not necessary to proceed with a particular partial printing step during the day, since all of the receipts supplied are already partially printed. The receipts in this embodiment, for example, are supplied with the merchant's contact information; it is their responsibility to order reams of partially printed and personalized receipts. The receipts can be supplied in rolls, the entire roll then containing information 24, 26 or 30, as indicated in FIG. 2; once the transaction has been carried out, the information 28 is completed, as also indicated in FIG. 2. Thus, the advantage is that the printing head 14, which is thermal, for example, expends less energy, and the transaction can follow upon another very quickly.

This second embodiment can be combined with the preceding one, or be considered separately. When it is taken in combination, this makes it possible to combine the advantages, e.g., to limit the wearing of the printing head while at the same time making it possible to pre-print information other than that already present, such as the date. Thus, printing of the receipts is accelerated while at the same time wearing of the head is limited. When this embodiment is considered separately, implementation of a bi-directional motor for moving the receipts is avoided.

According to another aspect, the method of printing receipts for an electronic payment terminal includes carrying out payment transactions with the terminal, and, after each transaction, simultaneously printing several receipts relating to the transaction carried out. This is applicable, in particular, when at least two receipts are printed at the end of a transaction, one of the receipts being intended for the customer, the other receipt being intended for the merchant; thus, rather than printing the receipts one after the other, the method enables simultaneous printing of the receipts. The method thus makes it possible to save time during printing. Instead of waiting for the receipts to be printed successively, the latter are issued at substantially the same time; if the printing operations are not necessarily initiated simultaneously, in any event, the end of printing of one of the receipts is not awaited in order to initiate the printing of another receipt.

To accomplish this, the terminal can comprise a plurality of printing heads 14, 141. The terminal then comprises a plurality of printing modules, as can be seen in FIG. 1. This makes it possible to launch simultaneous printing operations. In this way, two receipts 22 can be printed simultaneously, one for the customer, the other for the merchant. Each printer contains its own receipts for printing; e.g., in FIG. 1, the terminal contains a roll 23 of receipts for each printing head. It is also possible to anticipate for one roll to be used for two printing modules, each module printing one end of the roll.

The additional printing head(s) 141 can be detachable from the body 11 of the terminal. The advantage is that the user chooses to hook up the additional heads, which leaves them a greater degree of freedom in printing the receipts. Another advantage is that the users can equip themselves with an ordinary standard terminal and, if they later determine that a high rate of transactions is required, they can purchase other printing heads and therefore hook up other printing modules. The additional heads are each inside a module which is hooked up to the housing; more specifically, a first module is hooked up to the housing and any following module is hooked up to the previous one.

It is likewise possible to anticipate for the additional printing head(s) to not be physically attached to the terminal. It can be anticipated for the connection between the additional heads and the terminal to be carried out via waves, the additional receipts being printed remotely; for example, a Bluetooth connection can be used to connect the terminal to the additional printing head(s). The user can then move about with the terminal, the additional printing head(s) remaining at the cash register. One advantage is that the merchant can print the receipt intended for him on the printer, which, for example, remains at the cash register; this makes it possible to continuously print all of the receipts being returned to him without being concerned about the storage thereof.

Of course, this invention is not limited to the embodiments described for illustrative purposes. Thus, the receipts relating to the same transaction can be partially pre-printed and printed simultaneously. This enables a considerable amount of time to be saved during printing; as a matter of fact, not only is the printing operation itself faster, because information is already present on the receipt, but the receipt printing operations are also carried out in parallel. Therefore, it is foreseeable for the receipts relating to a single transaction to not be partially pre-printed but only printed simultaneously, which nonetheless enables time to be saved during printing, while at the same time avoiding implementation of a bidirectional motor for driving the receipts, or the use of all pre-printed receipts.

Although the present disclosure has been described with reference to one or more examples, workers skilled in the art will recognize that changes may be made in form and detail without departing from the scope of the disclosure and/or the appended claims.

The invention claimed is:

1. A method of printing receipts for an electronic payment terminal, the method comprising:

carrying out payment transactions with the terminal, after each transaction, simultaneously printing at least two receipts concerning the transaction made, and said receipts being already partially pre-printed at the time of the printing step, and belonging to a set of receipts comprising at least two receipts partially pre-printed, after the step of printing receipts relating to the transaction is carried out, partially pre-printing at least one receipt, wherein said partial printing step comprises printing the current date, and wherein the current date is no longer printed starting from a pre-determined hour, and performing the following steps using a processor of the terminal:

counting the already partially pre-printed receipts, counting transactions carried out, comparing a number of partially pre-printed receipts, and determining a remaining number of partially pre-printed receipts.

2. The method of claim 1, the terminal comprising a plurality of printing heads, the receipts each being printed on one printing head.

3. The method as claimed in claim 1, wherein at least one receipt is printed by the terminal and at least one receipt is printed remotely.

4. The method of claim 1, wherein the partially printed receipts contain information which is invariable from one transaction to another.

5. The method as claimed in claim 1, wherein the terminal comprises a printing head and the method comprises, after the partial printing step, crossing out a partially printed receipt using the printing head and a bidirectional motor, which drives movement of the printed receipt relative to the printing head and repositions the partially printed receipt at the printing head.

6. The method as claimed in claim 1, further comprising a step of supplying the receipts, all of the receipts being partially pre-printed.

7. The method of claim 1, wherein partially pre-printing comprises:

partially pre-printing the at least one receipt by unwinding the at least one receipt from a roll to a print head in a first direction using a bidirectional motor and then printing the current date; and winding the at least one partially pre-printed receipt back onto the roll in a second direction, opposite to the first direction using the bidirectional motor.

8. A payment terminal comprising:

at least one receipt printing head, wherein the terminal is configured to carry out a payment transaction and simultaneously print at least two receipts relating to the transaction, said at least two receipts being partially pre-printed at the time of simultaneous printing, wherein the terminal is configured to partially pre-print at least one further receipt after printing the at least two receipts relating to the transaction is carried out, wherein said partial pre-printing comprises printing the current date, and wherein the current date is no longer printed starting from a pre-determined hour, and counting the already partially pre-printed receipts, counting transactions carried out comparing a number of partially pre-printed receipts, determining a remaining number of partially pre-printed receipts.

9. The payment terminal of claim 8, further comprising a plurality of printing heads.

10. The payment terminal as claimed in claim 8, wherein the terminal is further capable of printing a receipt remotely.

11. The payment terminal as claimed in claim 8, further comprising receipts all of which are partially pre-printed.

12. The payment terminal as claimed in claim 8, comprising a bi-directional motor for moving the receipt.

13. The payment terminal of claim 12 wherein the terminal comprises a printing head and a processor, wherein the processor, printing head and bidirectional motor are configured to reposition the partially pre-printed receipt relative to the printing head and cross out the partially pre-printed receipt, after the partial printing step.

14. The payment terminal of claim 8, further comprising:

a processor and a bidirectional motor, which are configured to:

partially pre-print the at least one receipt by unwinding the at least one receipt from a roll to a print head in a first direction using the bidirectional motor and then printing the current date; and wind the at least one partially pre-printed receipt back onto the roll in a second direction, opposite to the first direction using the bidirectional motor.

15. A method of printing receipts for an electronic payment terminal, the method comprising:

carrying out payment transactions with the terminal, after each transaction, simultaneously printing at least two receipts concerning the transaction made, and said receipts being already partially pre-printed at the time of the printing step, and belonging to a set of receipts comprising at least two receipts partially pre-printed, after the step of printing receipts relating to the transaction is carried out, partially pre-printing at least two receipts, wherein said partial printing step comprises printing the current date, and wherein the current date is no longer printed starting from a predetermined hour, and performing the following steps using a processor of the terminal:

counting the already partially pre-printed receipts, counting transactions carried out, comparing a number of partially pre-printed receipts, and determining a remaining number of partially pre-printed receipts.

16. The method of claim 15, wherein partially pre-printing comprises:

partially pre-printing the at least one receipt by unwinding the at least one receipt from a roll to a print head in a first direction using a bidirectional motor and then printing the current date; and winding the at least one partially pre-printed receipt back onto the roll in a second direction, opposite to the first direction using the bidirectional motor.

17. A method of printing receipts for an electronic payment terminal, the method comprising:

before carrying out any transaction at the current date, partially pre-printing at least one receipt, wherein partially pre-printing comprises printing the current date, and wherein the current date is no longer printed starting from a predetermined hour, carrying out payment transactions with the terminal, after each transaction, simultaneously printing at least two receipts concerning the transaction made, and said receipts being already partially pre-printed at the time of the printing step, and belonging to a set of receipts comprising at least two receipts partially printed, and performing the following steps using a processor of the terminal:

counting the already partially pre-printed receipts, counting transactions carried out, comparing a number of partially pre-printed receipts, and determining a remaining number of partially pre-printed receipts.

18. The method of claim 17, wherein partially pre-printing comprises:

partially pre-printing the at least one receipt by unwinding the at least one receipt from a roll to a print head in a first direction using a bidirectional motor and then printing the current date; and winding the at least one partially pre-printed receipt back onto the roll in a second direction, opposite to the first direction using the bidirectional motor.

* * * * *

UNITED STATES PATENT AND TRADEMARK OFFICE

CERTIFICATE OF CORRECTION

PATENT NO. : 8,556,171 B2
APPLICATION NO. : 12/446422
DATED : October 15, 2013
INVENTOR(S) : David Naccache It is certified that error appears in the above-identified patent and that said Letters Patent is hereby corrected as shown below:

In the Claims

In column 7, Claim 1:

In line 40, insert a line break after “with the terminal,”

Signed and Sealed this
Twenty-third Day of June, 2015

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : 8,556,171 B2
APPLICATION NO. : 12/446422
DATED : October 15, 2013
INVENTOR(S) : David Naccache It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Fifteenth Day of September, 2015

Michelle K. Lee
*Director of the United States Patent and Trademark Office*